United States Patent [19]
Huang

[11] Patent Number: 5,018,275

[45] Date of Patent: May 28, 1991

[54] CUTTING DEVICE

[76] Inventor: Chi-Chieh Huang, No. 9, Feng-She Rd., Ta-She Tsun, Shen-Kang Hsiang, Taichung Hsien, Taiwan

[21] Appl. No.: 440,130

[22] Filed: Nov. 21, 1989

[30] Foreign Application Priority Data

Sep. 30, 1989 [TW] Taiwan .............................. 78209573

[51] Int. Cl.[5] .......................... B25F 3/00; B23D 21/06

[52] U.S. Cl. ............................................ 30/124; 30/92

[58] Field of Search .................... 30/123.6, 123.7, 124, 30/125, 127, 130, 90.1, 92, 115, 90.8; 78/409, 410, 412; 222/326, 327, 328, 329

[56] References Cited

U.S. PATENT DOCUMENTS

| | | | |
|---|---|---|---|
| 2,227,844 | 1/1941 | Roche | 30/92 |
| 2,539,124 | 1/1951 | Findlay | 30/92 |
| 2,602,570 | 7/1952 | Sherbondy | 222/327 |
| 3,740,994 | 6/1973 | De Carlo, Jr. | 72/410 |
| 3,903,725 | 9/1975 | Rommel | 72/410 |
| 4,199,973 | 4/1980 | Laux | 72/410 |
| 4,463,496 | 8/1984 | Reich et al. | 30/92 |
| 4,608,754 | 9/1986 | Kloster | 30/92 |
| 4,766,672 | 8/1988 | Undin et al. | 30/90.1 |

*Primary Examiner*—Douglas D. Watts
*Assistant Examiner*—Paul M. Heyrana, Sr.
*Attorney, Agent, or Firm*—Ladas & Parry

[57] ABSTRACT

A cutting device for a plastic pipe or the like includes a gun-like body having a forward fixed jaw member and a rear movable member carrying a cutting element preferably of a triangular shape and having two converging cutting edges. The movable member can be moved forward by operating a handle. In operation, the cutting element penetrates the object and then cut the object efficiently.

1 Claim, 6 Drawing Sheets

CUTTING DEVICE

BACKGROUND OF THE INVENTION

This invention relates to a cutting device used for cutting plastic pipe or the like, and particularly to a cutting device which has a front fixed jaw member and a rear movable member to carry and move a cutting element towards the front fixed jaw member.

A typical cutting device to cut a plastic pipe is shown in FIG. 1, having a handle 1 with a cutting jaw formed integrally therewith, a second cutting jaw 3 pivoted to the handle 1 and connected to a handle 2 through a linkage mechanism 4 and a torsion spring 5. The pipe placed between the jaws 1 and 3 can be cut by depressing and releasing the handles 1 and 2 alternatively. Such a device has a drawback in that the cutting jaws are liable to move laterally when subjected to the radial resisting forces which occur during the cutting operation so that the pieces cannot be cut neatly.

SUMMARY OF THE INVENTION

An object of the invention is to provide a cutting device which can efficiently and neatly cut a plastic pipe or the like.

According to the present invention, the cutting device comprises a body having a longitudinal bore extending from a front end of the body toward a rear end thereof, the front end of the body having a fixed jaw member extending forwardly; a grip member extending downward from the body; a movable member provided in said bore and having a front end to extend out of said bore toward said fixed jaw member, said front end of said movable member having a cutting element which effects cutting operations when moved toward said fixed jaw member; means for moving said movable member towards said fixed jaw member, said means incorporating a handle member pivoted to said body adjacent said grip member; a returning spring means to move said movable member backward; said fixed jaw member having a first portion extending forward from said front end of said body and a second portion which extends upward from said first portion, said second portion being forked and defining an aperture; said front end of said movable member having a front abutting face, said cutting element extending from said front abutting face and being in the form of a triangular plate which is aligned with said aperture.

The present exemplary preferred embodiments will be described in detail with reference to the accompanying drawings, in which:

DETAILED DESCRIPTION OF THE PREFERRED EMBODIMENTS

Figure 1:
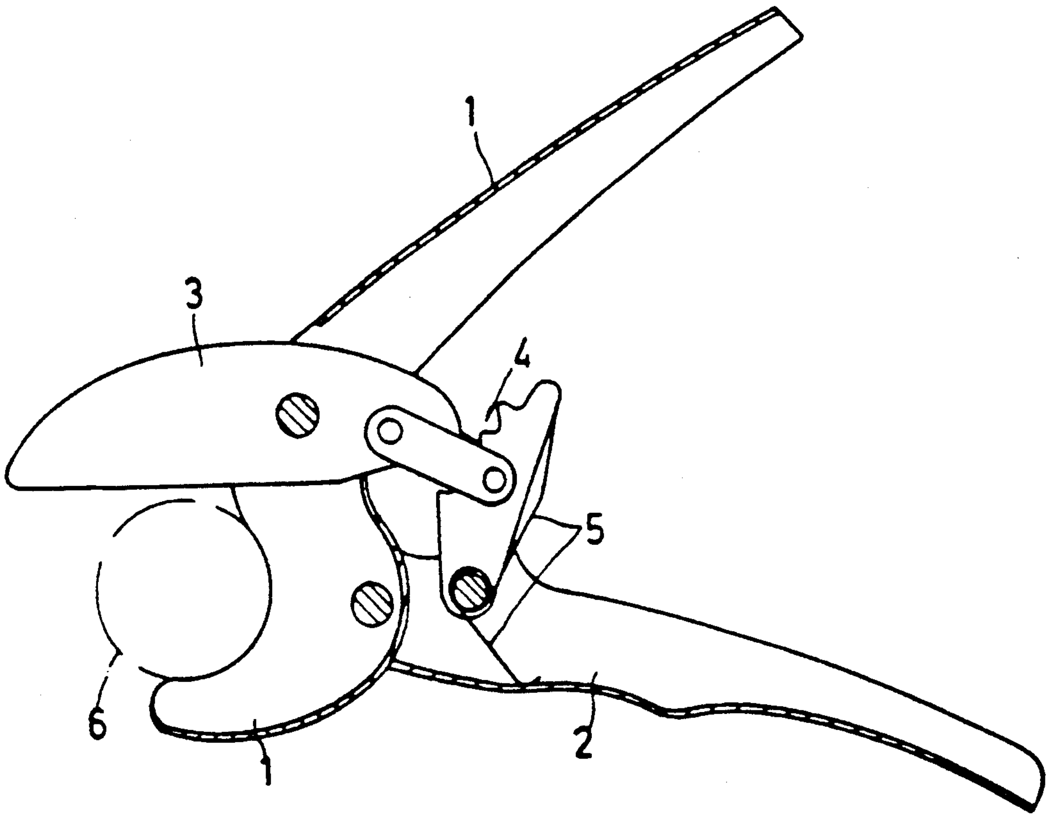
FIG.1 PRIOR ART
FIG. 1 shows a cutting device in the prior art.
Figure 2:
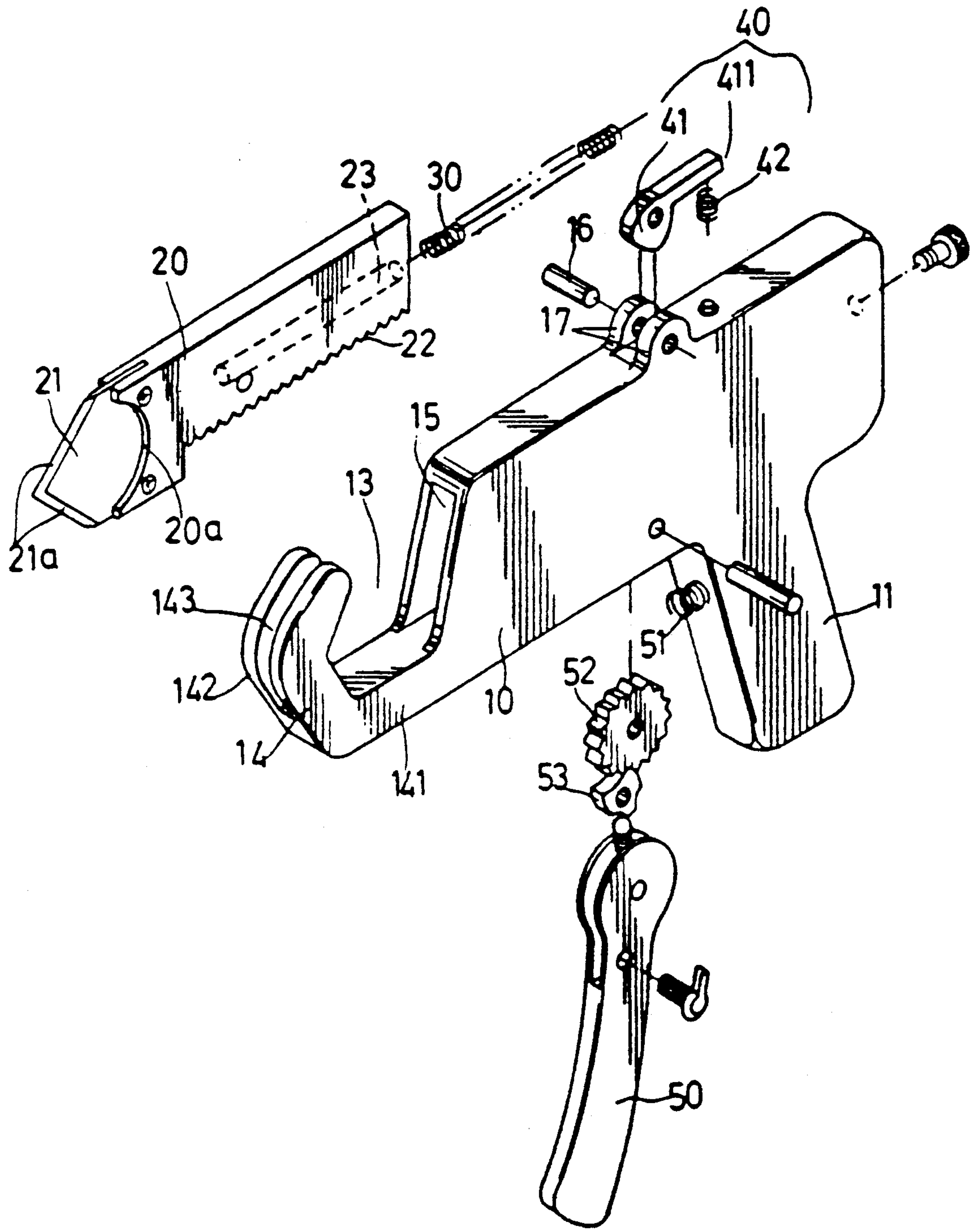
FIG. 2 is an exploded view of a preferred embodiment of the cutting device of the present invention.
Figure 3:
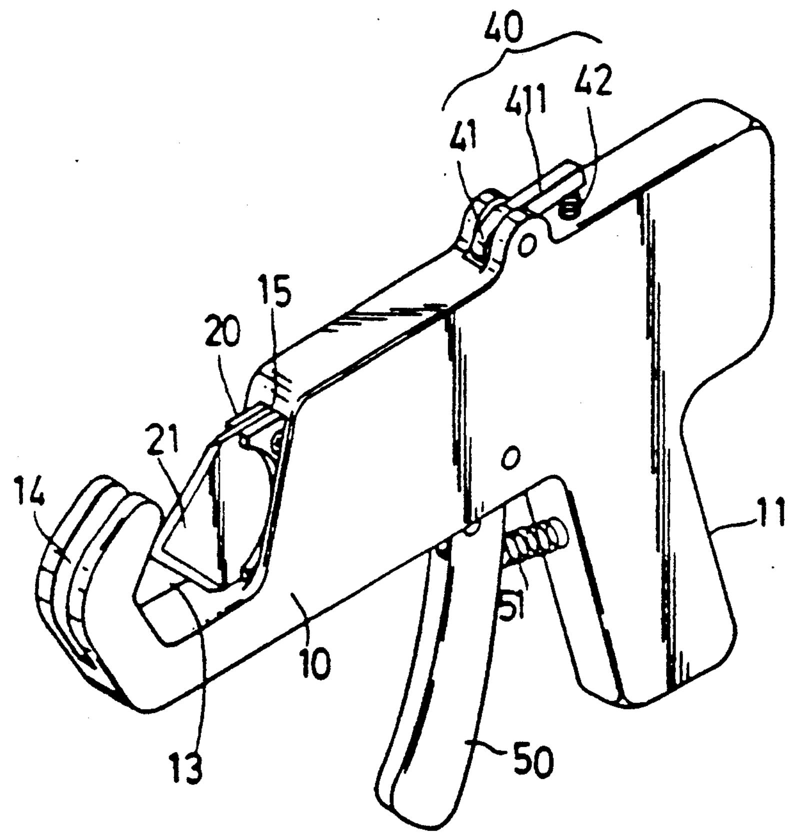
FIG. 3 is a perspective view of the cutting device of FIG. 2.

Referring to FIGS. 2 to 5, a preferred embodiment of a cutting device of the present invention includes a body 10 with a grip member 11 which simulates a gun body. The body 10 is provided with a bore 15, a mouth 13, and a fixed jaw member 14. The fixed jaw member 14 has a portion 141 which extends forward from the front end of the body 10 and a forked portion 142 which extends upward from the portion 141.

A movable member 20 is provided in the bore 15. The front end of the movable member 20 is provided with a curved abutment face **20*a* and a cutting element 21 which is in the form of a triangular plate with converging cutting edges 21*a*. The cutting element 21 is in alignment with an aperture 143 of the forked portion 142. The bottom side of the movable member 20 is provided with a rack 22. A blind bore 23 is provided in the movable member 20**.

The extension spring 30 is provided in the blind bore 23. One end of the spring 30 is fixed in the blind bore of the movable member 22, and the other end thereof is fixed to the rear end of the body 10.

A dog member 40 is mounted, by means of a pin 16, on two spaced apart lugs 17 which project from the top of the body 10. The dog member 40 includes a head member 41 and an arm 411 as well as a spring 42 which urges the arm 411 so that the head 41 extends into the bore 15 of the body 10 and depresses the movable member 20. The depression of the movable member causes the rack 22 thereof to engage with a ratchet wheel 52 which will be described hereinafter.

The handle 50 is connected to the ratchet wheel 52 and is pivotally attached to the body 10 adjacent to the grip 11. A pawl 53 is cooperatively attached to the handle 50. The ratchet wheel 52 is engaged with the teeth of the rack 22 and the pawl member 53 restricts the ratchet wheel 52 to turn only in a single direction.

Figure 4:
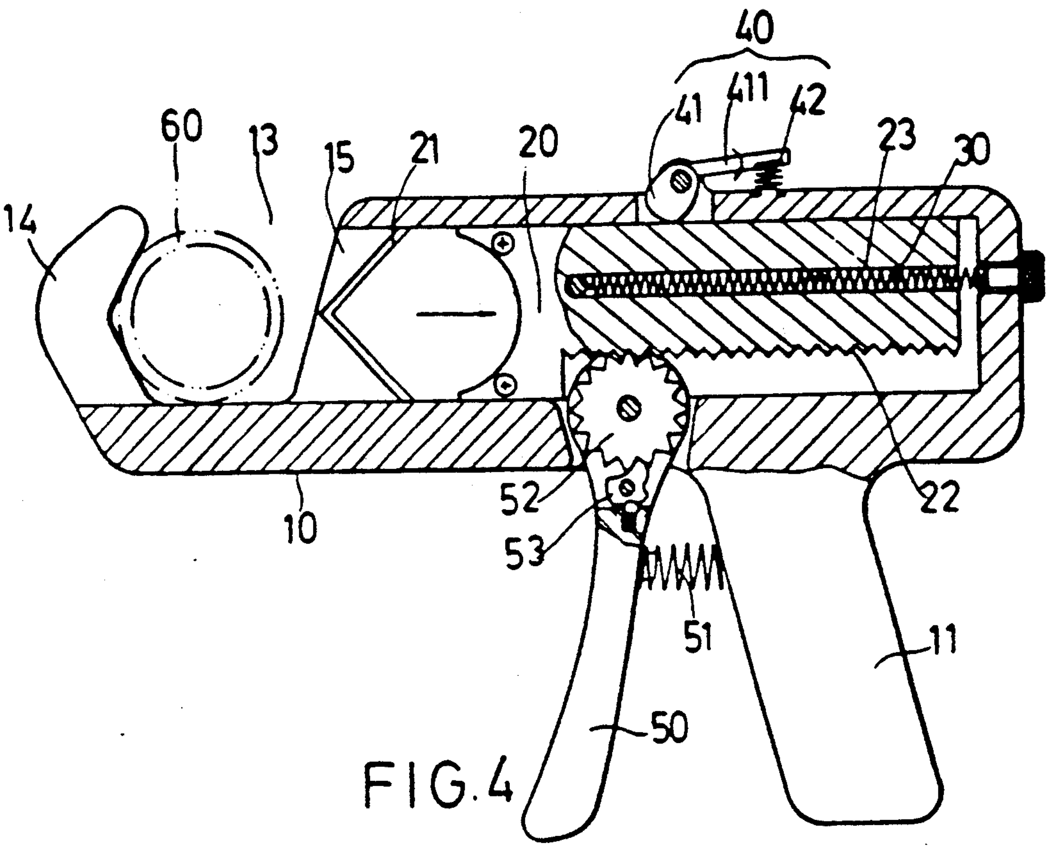
FIGS. 4, and 5 are sectional views showing the operation of the cutting device of FIG. 1.
Figure 5:
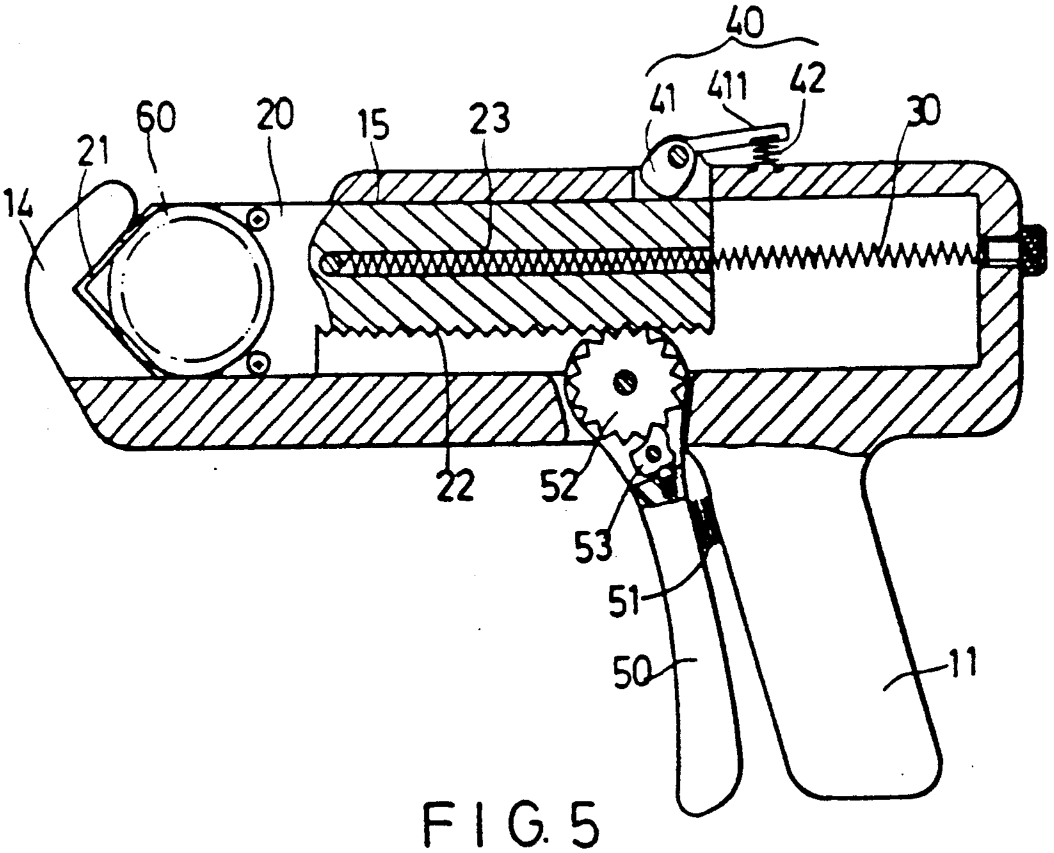

In operation, a plastic pipe 60 to be cut is placed in the mouth 13 of the body 10 as shown in FIG. 4. When the handle 50 is depressed against the grip member 11, the pawl 53 which is cooperable with the handle 50 turns the ratchet wheel 52 clockwise, thereby driving the movable member 20 towards the fixed jaw member 14. When the handle 50 is released, the pawl 53 idles and the ratchet wheel 51 does not turn accordingly. The cutting element 21 of the movable member 20 moves into and cuts the plastic pipe 60 when the handle 50 is depressed and released alternatively. After finishing the cutting operation, the movable member 20 can be moved backward by depressing the dog member 40 against the action of the spring 42. The depression of the dog member 40 allows the rack 22 of the movable member 20 to disengage from the ratchet wheel 52 and allows the movable member 20 to move backward by the returning spring 42.

It can be appreciated that the cutting element 21 of the present invention can cut the plastic pipe 6 more efficiently than is possible with the conventional cutting device described hereinbefore since the cutting element 21 is wedge-shaped. Moreover, the plastic pipe can be cut neatly by using the cutting device of the present invention due to the fact that the movable member 20 never moves laterally.

Figures 6, 7, 8:
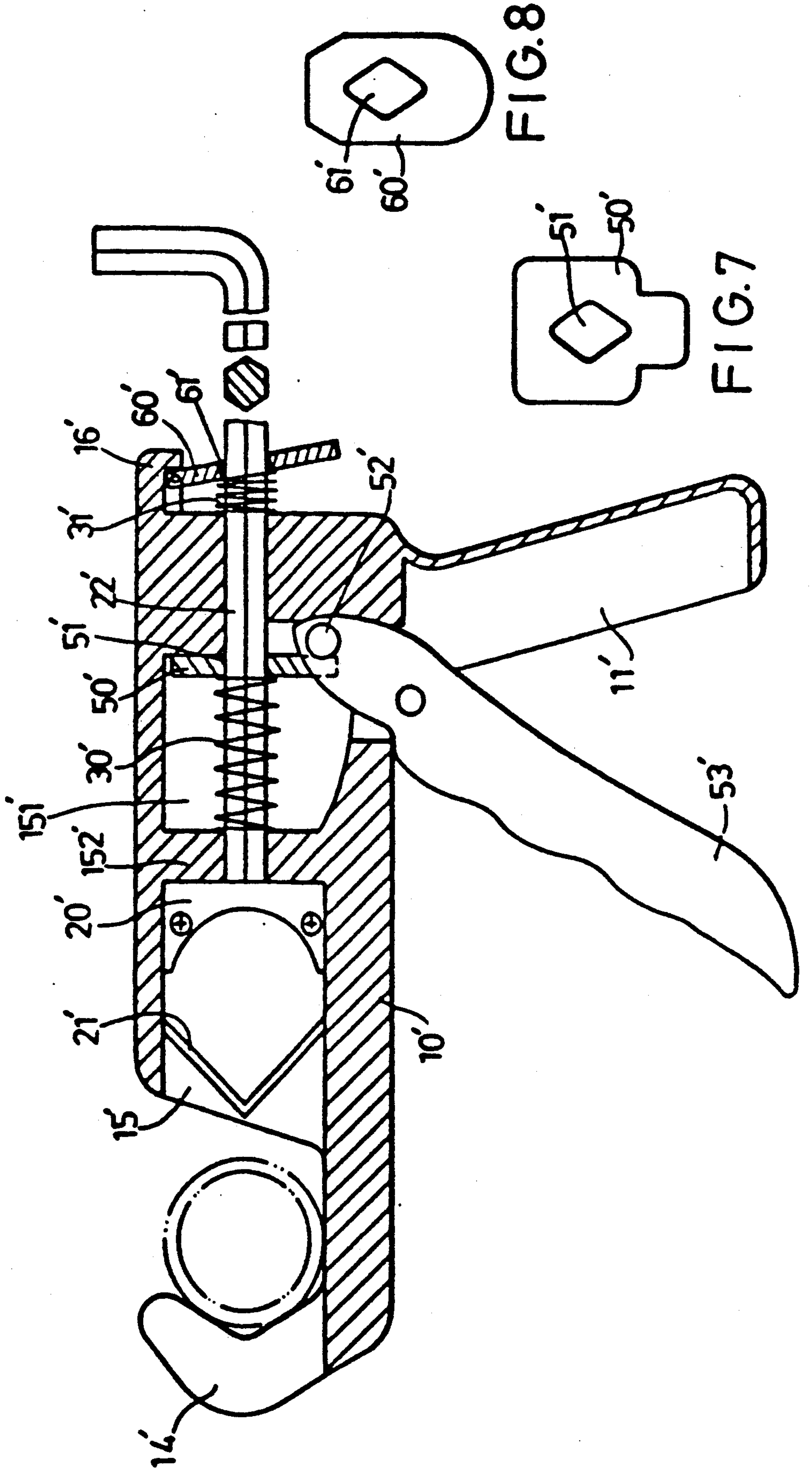
FIG. 6 shows a second embodiment of the cutting device of the present invention.
FIGS. 7 and 8 respectively show the driving transverse plate and the stop plate of the cutting device of FIG. 6.

FIG. 6 shows another embodiment of the present invention which comprises a body 10', a handle 53', a movable member having a head portion 20' and a shank 22, two returning springs 30' and 31', a driving transverse plate 50' and a stop transverse plate 60'. The body 10' is substantially similar to the body 10 of the previous embodiment and includes a bore 15' divided by a partition 152' so that an interior chamber 151' is formed in said body 10'.

The head portion 20' of the movable member incorporates a cutting element 21' which is similar to the cutting element 21 of the previous embodiment. The shank 22' of the movable member passes through a hole of the partition 152' and the chamber 151' and extends outward from the rear end of the body 10'. The driving transverse plate 50' and the stop transverse plate 60' are sleeved around the shank 22. Rhombic holes 51' 61' are respectively provided in the plates 50' and 60' respectively. The rhombic holes 51' and 61' allow the plates 50', 60' to slide along the shank 22' when the plates 50', 60' are perpendicular to the axis of the shank. When the plates 50', 60' are inclined, they engage with the shank 22'.

The returning spring 30' is placed between the plate 50' and the partition 152' and the returning spring 31' is placed between the plate 60' and the rear end of the body 10'. The handle member 53' is pivoted to the body 10 and incorporated with a driving pin 52' which engages with the driving transverse plate 50'. A restricting member 16' is formed at the rear end of the body 10' to engage with one side of the stop transverse plate 60'. Normally, the spring 30' urges the plate 50' rearward and the spring 31' urges the plate 60' rearward. Since the upper side of the plate 60' is stopped by the restricting member 16', the plate 60' is engaged with the shank 22'.

Figure 9:
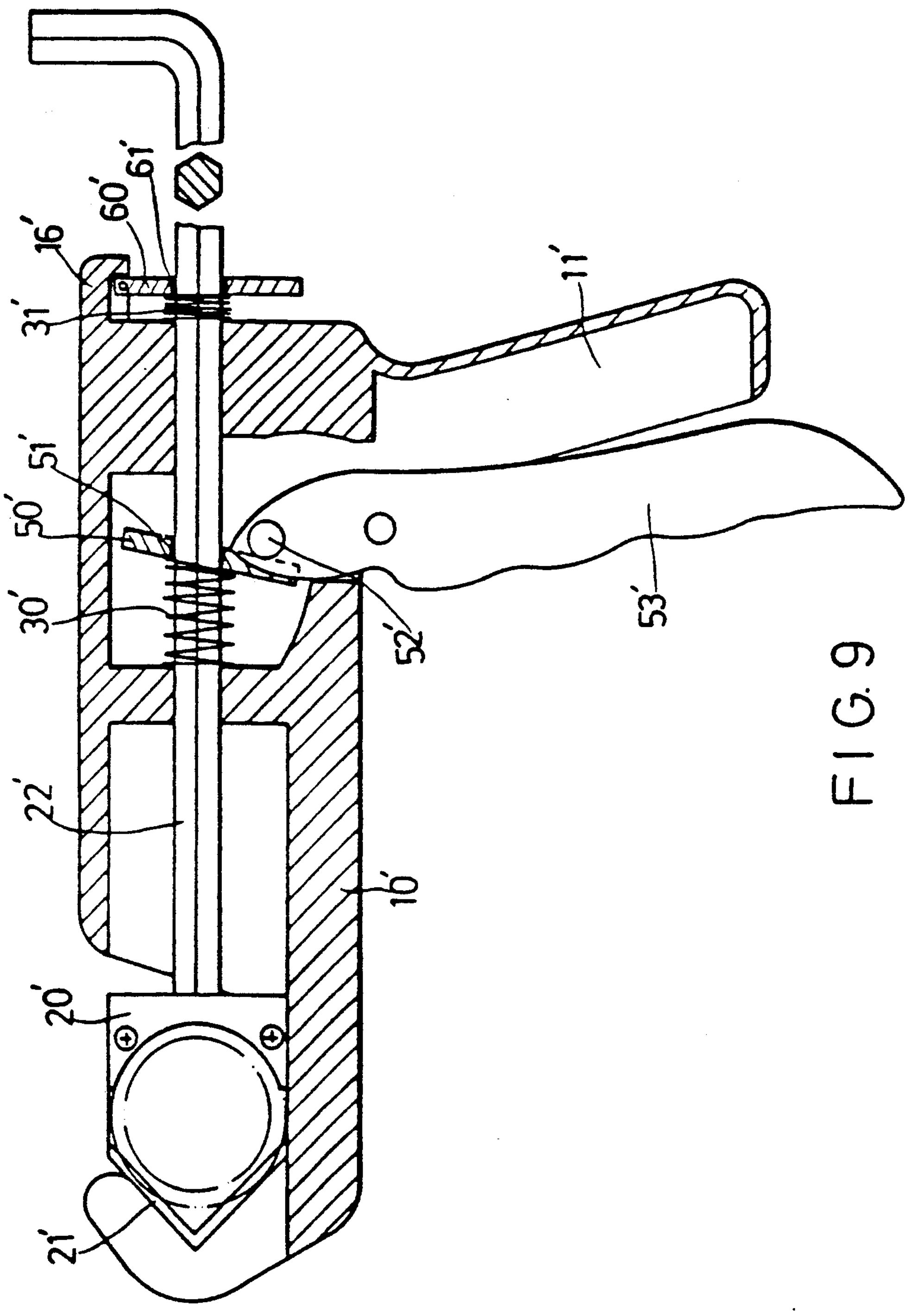
FIG. 9 shows the handle of the cutting device of FIG. 6 in a depressed position.

When the handle 53' is depressed so that it is moved towards the grip member 11', the driving pin 52' moves forward the driving plate 50'. Since the driving plate 50' is inclined relative to a line perpendicular to the shank when being pushed by the driving pin 52', the driving plate 50' engages with the shank 22' and moves the shank 22' forward. In this situation, the stop transverse plate 60' moves forward together with the shank 22, compressing the spring 31', as shown in FIG. 9.

When the handle 53' is released, the driving plate 50' disengages from the shank 22' and slides rearward along the shank 22' by the force of the returning spring 30'. In this situation, the stop plate 60' is inclined again, stopping the rearward movement of the shank 22'. By depressing and releasing the handle 53' alternatively, the cutting element 21' is moved to the object to be cut as described hereinbefore.

With the invention thus explained, it is apparent that various modifications and variations can be made without departing from the scope of the invention. It is therefore intended that the invention be limited only as indicated in the appended claims.

What I claim is:

1. A cutting device comprising:

a gun-like body having a front end, a rear end, a grip member extending downward adjacent said rear end, a longitudinal bore extending from said rear end toward said front end, a fixed jaw member disposed at said front end, and a mouth formed between said fixed jaw member and said longitudinal bore to receive a workpiece;

a movable member slidably provided in said bore and having a front end with a cutting element to extend into said mouth to effect cutting and a bottom end provided with rack teeth;

said fixed jaw member being forked and defining an aperture to permit said cutting element to move in therebetween;

a ratchet wheel mounted on said gun-like body adjacent said grip member and engaging said rack teeth;

a lever handle mounted to said gun-like body to turn cooperatively with said ratchet wheel, and incorporating a pawl member to engage said ratchet wheel, said ratchet wheel moving said movable member in a direction towards said front end when said lever handle is operated;

a first spring connected to said grip member and biasing said lever handle;

a second spring to return said movable member in a direction towards said rear end, and a dog member mounted on said gun-like body above said movable member and urged in a first position to depress said movable member against said ratchet wheel and in a second position to allow said second spring to return said movable member towards said rear end.

* * * * *